United States Patent [19]

Usui

[11] Patent Number: 4,844,231
[45] Date of Patent: Jul. 4, 1989

[54] ROLLER CONVEYER SYSTEM

[75] Inventor: Motosuke Usui, Chiba, Japan

[73] Assignee: Sony Corporation, Tokyo, Japan

[21] Appl. No.: 92,145

[22] Filed: Sep. 1, 1987

[30] Foreign Application Priority Data

Oct. 15, 1986 [JP] Japan .................................. 61-244661

[51] Int. Cl.[4] .............................................. B65G 21/20
[52] U.S. Cl. ................................. 198/345; 198/465.3;
198/577; 198/781; 198/783; 198/784
[58] Field of Search ...................... 198/345, 463.6, 781, 198/783, 784, 790, 465.3, 803.2, 577

[56] References Cited

U.S. PATENT DOCUMENTS

| 1,900,149 | 3/1933 | Anderson. | |
|---|---|---|---|
| 4,006,815 | 2/1977 | Werntz | 198/781 |
| 4,193,493 | 3/1980 | Ekstrand | 198/781 |
| 4,201,284 | 5/1980 | Brems | 198/345 |
| 4,314,629 | 2/1982 | Shilander et al. | 198/781 X |
| 4,325,474 | 4/1982 | Rae | 198/781 |
| 4,331,228 | 5/1982 | Galarowic | 198/345 X |
| 4,428,300 | 1/1984 | Ziegenfus et al. | 198/345 X |
| 4,479,572 | 10/1984 | Merz | 198/345 |
| 4,570,780 | 2/1986 | Thwaites et al. | 198/781 |
| 4,600,093 | 7/1986 | Adams | 198/781 X |
| 4,662,503 | 5/1987 | Lycke | 198/345 |
| 4,706,801 | 11/1987 | Vessey | 198/781 |
| 4,721,203 | 1/1988 | Kimball et al. | 198/781 |

FOREIGN PATENT DOCUMENTS

| 0014666 | 8/1980 | European Pat. Off. . |
| 0038871 | 4/1982 | European Pat. Off. . |
| 0051867 | 5/1982 | European Pat. Off. . |
| 7831423 | 4/1979 | Fed. Rep. of Germany . |
| 2004243 | 3/1979 | United Kingdom . |
| 2035942 | 6/1980 | United Kingdom . |

Primary Examiner—Robert J. Spar
Assistant Examiner—D. Glenn Dayoan
Attorney, Agent, or Firm—Ronald P. Kananen

[57] ABSTRACT

A roller conveyer system employs a plurality of driven roller assemblies. Each driven roller assembly comprises a roller and a driven pulley, wherein the driven pulley is connected to a driving device, such as a drive motor via a drive belt for transmitting driving torque. On the other hand, the roller is frictionally cooperates with the driven pulley so as to be driven by the driving torque transmitted from the driven pulley. An auxiliary driving mechanism may be provided in the conveyer system for driving some of the driven roller assemblies. The auxiliary driving mechanism is variable of the driving speed so as to facilitate rapid stop and feed of the object at each production station.

40 Claims, 10 Drawing Sheets

ROLLER CONVEYER SYSTEM

BACKGROUND OF THE INVENTION

1. Field of the Invention

The present invention relates generally to a conveyer system used in industrial production lines and so forth. More specifically, the invention relates to a so-called free-flow type roller conveyer system application for a production line requiring high precision and high accuracy in production, such as IC chip production lines and so forth.

2. Description of the Background Art

One of the typical free-flow type conveyer systems is known as a roller-chain type conveyer system. This type of conveyer system employs an endless chain which carries a plurality of idler rollers arranged at regular intervals. An object to be conveyed is mounted on an idler roller and carried according to the chain drive. Since the object is mounted on an idler roller, the movement of the object can be stopped by exerting a small resistance or movement restricting force. Therefore, in practical operation, the object can be held at respective stations in the production line for manufacturing operations. However, in such a system, the chain and rollers are continuously driven even while the object is stopped at a station. This inevitably causes a vertical vibration of the object at a stopped position to interfere with or make it difficult to perform the required production operation. When the treatment required at the production station requires a high degree of precision, such vertical vibration becomes a particularly critical problem.

In order to solve such problems in roller-chain type conveyer systems, there has been proposed a roller drive type conveyer system which drives the object by the rotating torque of a plurality of driven rollers stationarily installed along the conveying path and driven by means of a driving means in a feed direction. In such types of conveyer systems, since the conveying force is exerted onto the object simply by the surface-to-surface friction between the object and the periphery of the driven roller, the object can be easily stopped at a production station. Each driven roller in this type of conveyer system is rotatably supported on a roller shaft extending from a stationary support frame. The roller is connected to a driving means, such as a driving motor via an endless drive belt which transmits the driving torque. In this construction, a substantially high accuracy of respective components of the conveyer system is required in order to eliminate vibration of the object which would otherwise be caused due to production errors in respective components. However, as will be appreciated, it is not practically possible to provide satisfactorily high accuracy in production of respective components of the conveyer line and thus is not possible to suppress the vibration of the object to a satisfactory level.

SUMMARY OF THE INVENTION

Therefore, it is an object of the present invention to provide a novel roller conveyer system which successfully and satisfactorily suppresses vibration provided to an object to be conveyed thereby and thus is useful in a production line which requires substantially high precision and accuracy.

Another object of the invention is to provide a roller conveyer system which can stably and rapidly stop and feed the object and thus reduces production tact-period at each production station.

In order to accomplish the aforementioned and other objects, a roller conveyer system, according to the present invention, employs a plurality of driven roller assemblies. Each driven roller assembly comprises a roller and a driven pulley, wherein the driven pulley is connected to a driving device, such as a drive motor via a drive belt, through which the driving torque is transmitted. On the other hand, the roller frictionally cooperates with the driven pulley so as to be driven by the driving torque transmitted from the driven pulley.

In the preferred constructions, an auxiliary driving mechanism is provided in the conveyer system for driving some of the driven roller assemblies. The driving speed of the auxiliary driving mechanism is variable so as to facilitate a rapid stop and feed of the object at each production station.

According to one aspect of the invention, a conveyer system comprises a pair of frames extending longitudinally and in an essentially parallel relationship to each other, a plurality of roller assemblies mounted on the frames, each of the roller assemblies including a roller rotatably supported on the frame and aligned to rollers of other roller assemblies to define a conveying path through which an object to be conveyed is transferred, a driving mechanism for rotatingly driving the rollers in the roller assemblies for exerting feed force to the object, and friction means interposed between the driving mechanism and the rollers of the roller assembly for connecting and disconnecting the driving mechanism to the rollers, the friction means normally operative to connect the driving mechanism to the rollers for transmitting the driving force of the drive mechanism to the rollers for rotation and being responsive to a resistance against rotation to be exerted on the roller and greater than a given magnitude to disconnect the driving mechanism from the roller on which the resistance greater than the given magnitude is exerted.

In the alternative, a conveyer system comprises a pair of frames extending longitudinally and essentially parallel to each other, wherein a plurality of roller assemblies are mounted on the frames, each of the roller assemblies including a roller rotatably supported on the frame and aligned with rollers of other roller assemblies so as to define a conveying path through which the object to be conveyed is transferred, a driving mechanism for rotatingly driving the rollers in the roller assemblies to exert feed force on the object, and friction means interposed between the driving mechanism and the rollers of the roller assembly for connecting the driving mechanism to the rollers, the friction means normally operative to connect the driving mechanism to the rollers for transmitting the driving force of the drive mechanism to the rollers for rotation and being responsive to a resistance against rotation to be exerted on the roller and greater than a given magnitude to allow slip between the driving mechanism and the roller on which the resistance greater than the given magnitude is exerted.

Preferably, the friction means is active on each of the rollers so as to establish and block power transmission between each roller and the driving mechanism independently of other rollers so that when one of the rollers is disconnected from the driving mechanism, other rollers are driven by the driving mechanism to rotate by sustained power transmission from the driving mechanism. The driving mechanism comprises a drive motor, a power train for transmitting the driving torque of the drive motor, and a plurality of pulleys drivingly associated with the power train to be driven by the driving torque of the drive motor, each of the pulleys cooperating with one of the rollers for rotation therewith while the friction means is active to connect the driving mechanism and the corresponding roller.

In the preferred construction, the friction means comprises a first periphery on the roller cooperating with a second periphery of the pulley, the first and second peripheries being mated to each other and frictionally engaging for transmitting driving torque from the drive motor via the power train at the first and second peripheries allowing mutual slip for allowing stopping of rotation of the roller in response to a resistance greater than the given magnitude while the pulley continues to rotate. The pulleys cooperating with each other are coaxially arranged and supported by a common shaft extending from the frame.

If necessary, the conveyer system may further comprise means for limiting contact area between the first and second peripheries, which contact area limiting means determines the contact area between the first and second peripheries and whereby determines magnitude of friction between the first and second peripheries.

In the alternative, the conveyer system may further comprise means, oriented at a predetermined orientation in the conveyer path, for quickly stopping and quickly feeding out the object, wherein the quickly stopping and quickly feeding out means includes an auxiliary driving mechanism being associated with rollers oriented at positions corresponding to the orientation of the quickly stopping and quickly feeding out means and having a variable driving speed for varying a rotation speed of the associated rollers. The auxiliary driving mechanism decelerates the rotation speed of the associated rollers when the object reaches a first predetermined point in the conveyer line and stops revolution for a given period of time when the object reaches a second predetermined point for stopping the object at the second point. The auxiliary driving mechanism resumes rotation after the given period of time for driving the associated rollers at a given speed. Otherwise, the auxiliary driving mechanism accelerates the rotation speed of the associated rollers when the object reaches a first predetermined point in the conveyer line, decelerates rotation speed of the associated rollers when the object reaches a second predetermined point downstream of the first predetermined point, and stops revolution for a given period of time when the object reaches a third predetermined point for stopping the object at the third point. Similarly to the foregoing, the auxiliary driving mechanism resumes revolution after the given period of time for driving the associated rollers at a given speed.

The quickly stopping and quickly feeding out means may further comprise a lifting means operable between an initial down position and a lifted up position where it lifts up the object away from the conveyer line. The lifting means is oriented at the second point. The quickly stopping and quickly feeding out means may also comprise a braking means provided at an orientation corresponding to the first point and active on one or more rollers located at the first point for slowing down rotation speed of the corresponding rollers.

According to another aspect of the invention, a roller conveyer system comprises a plurality of roller assemblies arranged in alignment to define a conveying path, through which an object to be conveyed is transferred, each of the roller assemblies including a first rotary component having a first periphery contacting with the object for exerting feeding energy thereto and a second periphery, and a second rotary component having a third periphery frictionally engaging with the second periphery of the first rotary component for cooperating with the first and second rotary components, the magnitude of friction established between the second and third peripheries being so determined as to normally maintain frictional engagement and to break frictional engagement to allow slip between the second and third peripheries for allowing stopping of rotation of the first rotary component while the second rotary component maintains rotation, in response to a resistance against rotation of the first rotary component exerted on the first periphery that is greater than a given magnitude, and a driving mechanism for rotatingly driving the second components of the roller assemblies.

The driving mechanism comprises a drive motor and a power train for transmitting the driving torque of the drive motor, which power train includes a drive belt wound around the second rotary components of the roller assemblies for transmitting driving torque. The first rotary component and the second rotary component cooperate with each other and are coaxially arranged and supported by a common shaft extending from a pair of support frames respectively extending along the conveyer path.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, but are for explanation and understanding only.

In the drawings.

DESCRIPTION OF THE PREFERRED EMBODIMENTS

Figure 1:
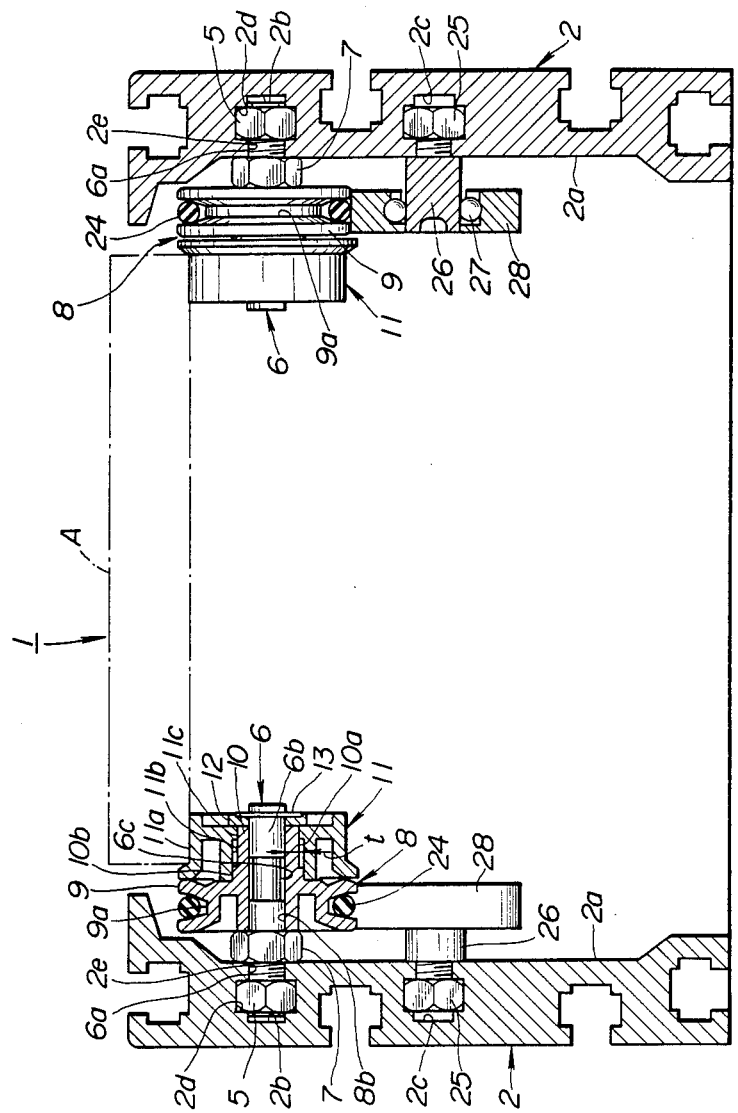
FIG. 1 is a sectional view of the preferred embodiment of the roller conveyor system of FIG. 2, which section is taken along line II—II of FIG. 2.
Figure 2:
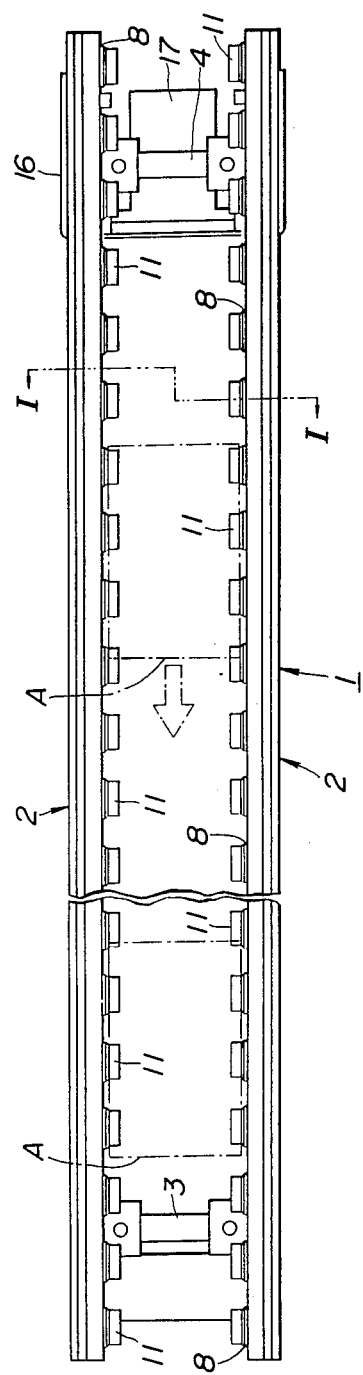
FIG. 2 is a plan view of the preferred embodiment of a roller conveyor system according to the present invention.
Figure 3:
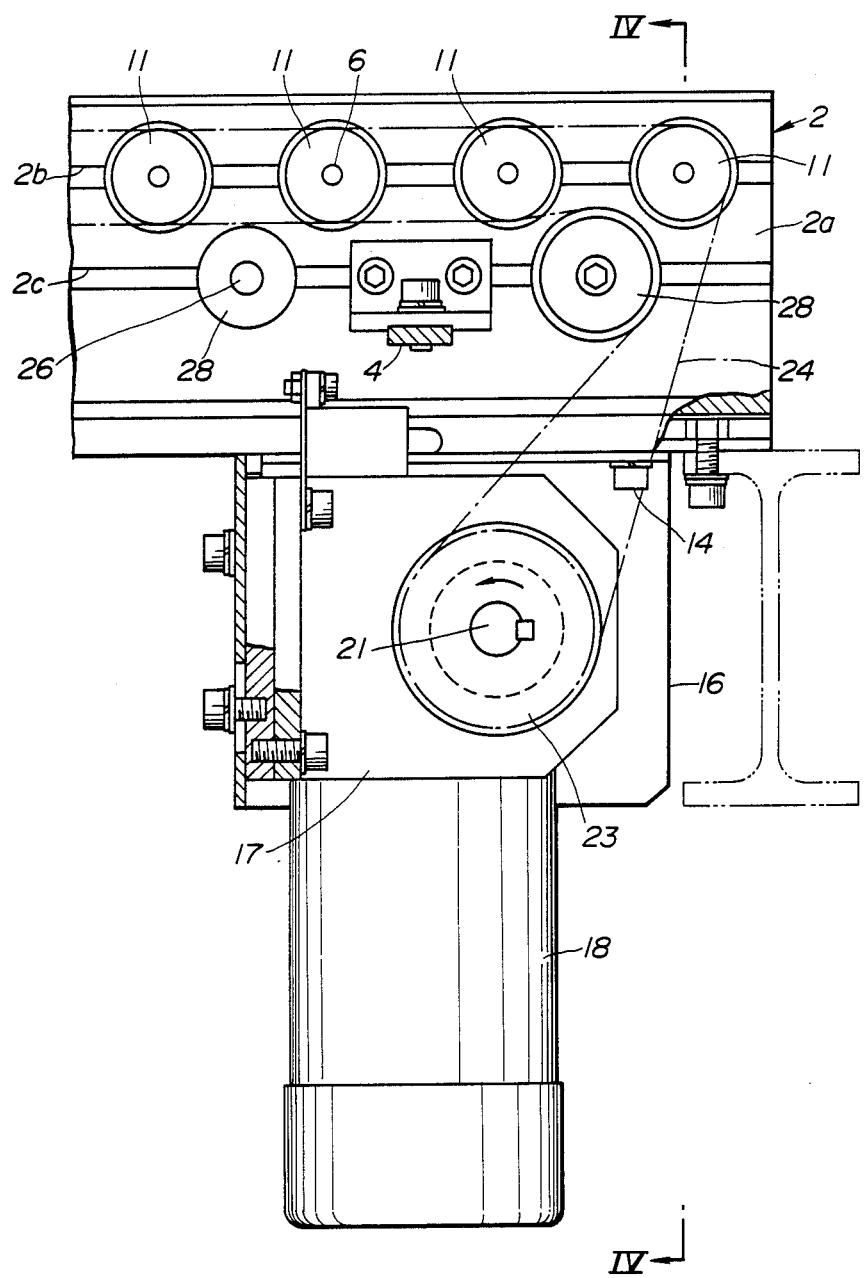
FIG. 3 is an enlarged side elevation of a drive mechanism of the roller conveyer system of FIG. 1.

Referring now to the drawings, particularly to FIGS. 1 to 4, the preferred embodiment of a free-flow type roller conveyer system, according to the present invention, is generally represented by the reference numeral "1". The conveyer system includes a pair of support frames 2. The support frames 2 are in the form of vertically extended plates longitudinally extending along a conveyer path. The support frames 2 are spaced apart and extend parallel to each other. The space between the support frames 2 is determined by means of spacers 3 and 4. The spacers 3 and 4 are arranged adjacent respective longitudinal ends of the support frames 2. In addition, one or more intermediate spacers may be provided between the support frames when the length of the support frames 2 is great.

A plurality of essentially C-shaped recesses 2b and 2c are formed on the opposing surfaces 2a of the support frames 2. The recesses 2b are formed adjacent the upper end of the support frames 2 and longitudinally aligned along the substantially horizontal upper edge of the frame. Each recess 2b defines a space 2d within the support frame 2, which space 2d is exposed to the surface 2a via an opening 2e. As seen from FIG. 1, the diameter of the opening 2e is smaller than that of the space 2d. A nut 5 is built-in to each space 2d of the recesses 2b. A roller support shaft 6 formed with a threaded end portion 6a extends through the opening 2e to engage with the nut 5 within the space 2d. To the threaded end portion 6a of the shaft 6, a fastening nut 7 is also engaged. The nut 7 is oriented outside of the opening 2e. Therefore, the nuts 5 and 7 bind the peripheral wall of the support frame around the opening 2e from both sides to rigidly secure the shaft 6 on the surface 2a of the support frame 2. The roller support shaft 6 thus extends from the surface 2a toward the surface 2a of the other frame. At this time, the axis of the roller support shaft 6 is essentially perpendicular to the major plane of the surface 2a.

In the preferred construction, the nut 7 is welded onto the roller support shaft so that the shaft may be rigidly installed on the surface by threading the threaded end portion to the nut 5.

The roller support shaft 6 also has a bearing section 6b. A driven pulley 8 is rotatably mounted on the shaft. The pulley 8 is retained on the roller support shaft 6 by means of a washer 12 and a clip 13. The driven pulley 8 is preferably made of a synthetic resin and constituted by an outer ring section 9 and an inner cylindrical section 10. As will be seen from FIG. 1, the inner cylindrical section 10 is axially longer than the ring section 9 so that it may protrude at the side remote from the surface 2a of the frame 2. The ring section 9 has a sectionally V-shaped annular groove 9a on the outer periphery thereof. The groove 9a is designed to receive a drive belt 24 to transmit the driving torque of the driving mechanism which will be described later. On the other hand, the outer periphery of the inner cylindrical section 10 serves as a bearing for a roller 11. The roller has an outer cylindrical section 11a and an inner cylindrical section 11b. The inner cylindrical section 11b frictionally contacts the outer periphery of the inner cylindrical section 10 of the driven pulley. Therefore, the driven pulley 8 and the roller 11 cooperate with each other for rotating together by the friction between the outer periphery of the inner cylindrical section 11 of the pulley and the inner periphery of the inner cylindrical section 10 of the pulley. On the other hand, the outer periphery of the outer cylindrical section 11a of the roller 11 serves as a contact surface with the object A to be conveyed.

As clearly seen from FIG. 1, the bearing section 6b of the roller support shaft 6 has an annular groove 6c at the intermediate portion thereto. This groove 6c serves to reduce the contact area between the inner periphery of the cylindrical section 6b and the outer periphery of the roller support shaft. In other words, by adjusting the axial length of the groove 6c, the contact area between the bearing section 6b and the cylindrical section 10 can be adjusted to determine the resistance against the rotation of the pulley 8 about the roller support shaft.

It should be appreciated, though the shown embodiment forms a single groove for adjusting the friction between the bearing section 6b and the cylindrical section 10 by adjusting the axial length of the groove, it is possible to form a plurality of grooves on the outer periphery of the bearing section 6b to adjust the friction between the bearing section 6b and the cylindrical section 10. Furthermore, though the shown embodiment has the groove 6c on the bearing section 6b of the roller support shaft, equivalent friction adjustment can be performed by providing the groove on the inner periphery of the cylindrical section 10.

Similarly, in the shown embodiment, a stepped up section 10b is formed on the outer periphery of the cylindrical section 10. On the other hand, a projection 11c is formed on the inner periphery of the inner cylindrical section 11b of the roller 11. The height of the stepped up section 10b and the projection 11c are the same. Therefore, the surfaces of the stepped up section 10b and projection 11c contact each other. As a result, the outer periphery of the cylindrical section 10 and the inner periphery of the cylinder section 11b have a substantially limited contact area. This reduces friction between the pulley and the roller. Therefore, by adjusting the amount of contact area, the magnitude of friction between the pulley 8 and the roller 11 can be adjusted.

In the practical embodiment, the contact area between the cylindrical section 10 of the pulley 8 and the cylindrical section 11b of the roller 11 is set to be very small so that the frictional driving force is small enough to be easily overcome. By overcoming the frictional cooperation, rotation of the roller 11 is stopped while the pulley 8 continues to rotate.

In order to drive the roller assembly constructed as set forth above, a drive mechanism 30 is provided adjacent one longitudinal end of the support frames 2. The drive mechanism comprises a drive motor 18 and a reduction gear unit 17. The reduction gear unit 17 is housed within a housing to form a reduction gear box. The gear box is mounted on the support frame 2 by means of a mounting bracket 16 which is fixed to the support frame by means of the fastening bolts 14 and nuts 15. The driving motor 18 cooperates with the reduction gear unit 17 suspended from the support frame 2 via the reduction gear box unit.

The reduction gear unit 17 is designed to be driven by the drive motor 18. The reduction gear unit 17 includes a bevel gear 20 rigidly engaged with the outer end of the output shaft 18a of the drive motor 18 so as to be driven with the shaft by the driving torque of the motor. The reduction gear unit 17 further comprises a drive gear 22 which is in the form of a bevel gear and meshed with the bevel gear 20 to be driven thereby. The bevel gear 22 is rigidly secured on a drive shaft 21. The drive shaft 21 extends through the bevel gear 22. Drive pulleys 23 are rigidly engaged with both ends of the drive shaft 21 to be driven thereby. The drive pulleys 23 are formed with essentially V-shaped grooves 23a to engage with drive belts 24. The drive belts 24 are further wound around the driven pulleys 8 and engage with the annular V-shaped grooves 9a of the ring sections 9 of the pulleys 8 to transmit thereto the driving torque of the drive motor 18.

Figure 4:
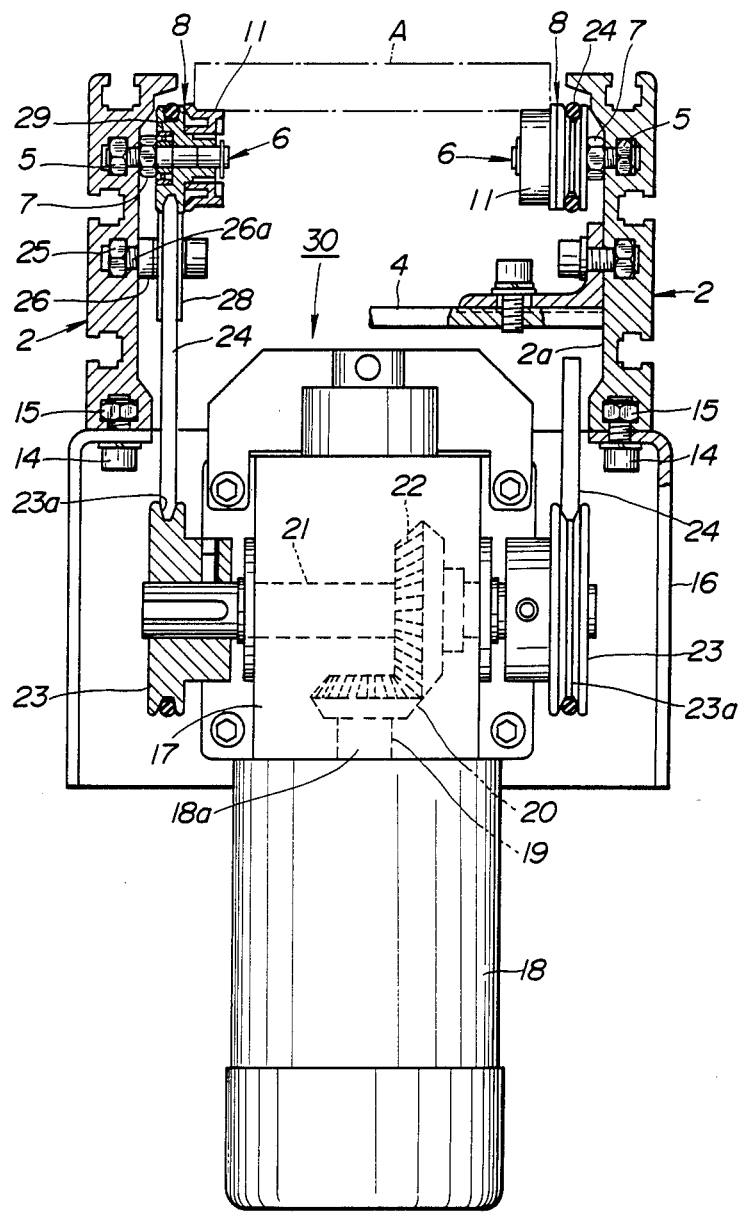
FIG. 4 is a section taken along line IV—IV of FIG. 3.

As will be seen from FIG. 4, the diameter of the bevel gear 20 is smaller than that of the drive gear 22 and is meshed with the latter in perpendicular fashion. The difference of the diameters between the bevel gear 20 and the drive gear 22 serves to reduce rotation speed of to the drive pulleys 23 and, in turn, to increase the driving torque. On the other hand, the bevel gear layout of the reduction gear unit 17 serves for converting the direction of rotational torque. This allows the drive motor 18 to be vertically aligned with the reduction gear unit with respect to the support frame 2. This clearly reduces the lateral space required for accommodating the driving mechanism.

Tension pulleys 28 are provided adjacent the path of the drive belts 24 for adjusting the tension to be exerted on the belts. The tension pulleys 28 are rotatably supported by means of pulley shafts 26. Each pulley shaft 26 has a threaded end section 26a which engages with a nut 25 received within the recess 2c of the support frame 2. A bearing may be disposed between the outer periphery of the pulley shaft 26 and the tension pulley 28 so that the latter can rotate freely relative to the former.

As shown in FIG. 4, a bearing 29 is disposed between the inner periphery 8b of the pulley 8 and the outer periphery of the shaft 6 for the pulley located at the each longitudinal ends of series of longitudinally aligned pulleys 8. This bearing 29 serves for helping to provide further smooth rotation of the end pulleys and thus reduce resistance to rotation despite greater contact area between the drive belt 24 and the groove 9a of the ring section 9 of the pulley.

Figure 5:
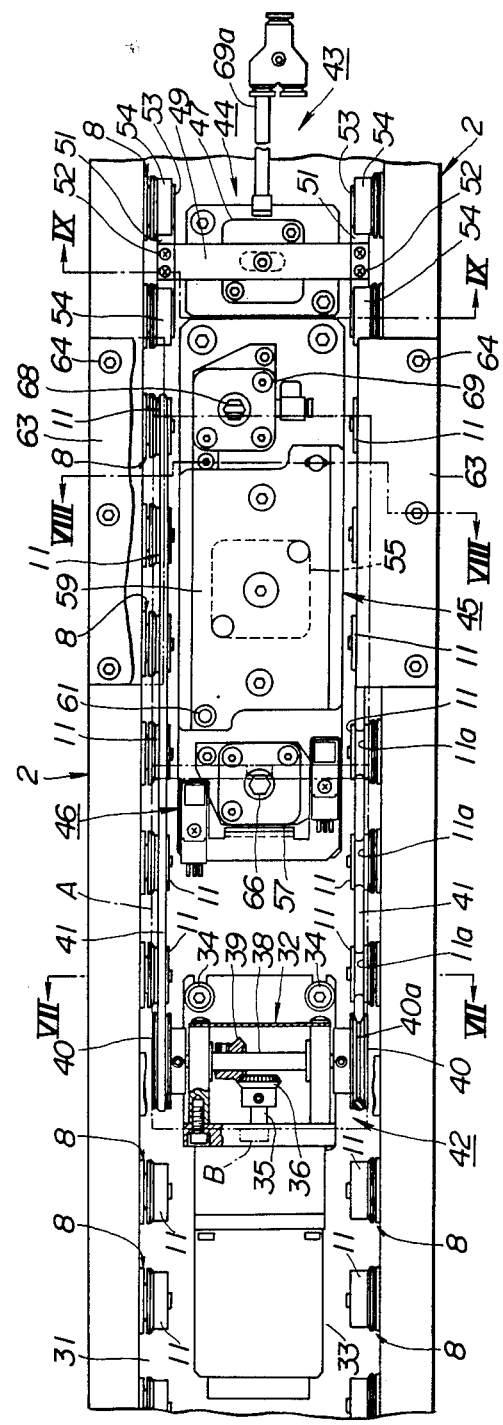
FIG. 5 is an enlarged plan view of a section of the roller conveyer system of FIG. 1, in which section an auxiliary drive mechanism is installed for rapid stop and rapid feed.

As will be appreciated from FIG. 5, the conveyer extends through one or more production stations. The objects to be conveyed are to be stopped at each station for production or assembling operations. In order to allow quick stop and quick feed-out of the objects, the rollers 11 oriented at the production station are formed with essentially U-shaped grooves 11a. On the other hand, a variable speed motor 33 is mounted on a base 31 which is rigidly secured to the frame 2 by means of bolts and nuts (not shown). The drive shaft of the motor 32 is connected to a gear box 32. Similarly to the foregoing gear unit 17, the gear box 32 includes a bevel gear 36 secured to a rotary shaft 35. The bevel gear 36 meshes with a bevel gear 39 which is secured to a gear shaft 38 rotatably supported by means of a bearing 37. Both ends of the gear shaft 38 extend laterally from the gear box 32. Drive pulleys 40 formed with essentially V-shaped grooves 40a are secured at both ends of the gear shaft 38. Drive belts 41 engage with the V-shaped grooves 40a of the drive pulleys 40 and the U-shaped grooves 11a of the rollers 11. Therefore, driving torque generated by the variable speed motor 33 is transmitted to respective associated rollers 11 via the drive belts 41. As will be appreciated herefrom, since the driving speed of the motor 33 is variable, the rotation speed of the rollers 11, which are associated with the motor 33 via the drive belts 41, is variable depending upon the revolution speed of the motor.

Figure 6:
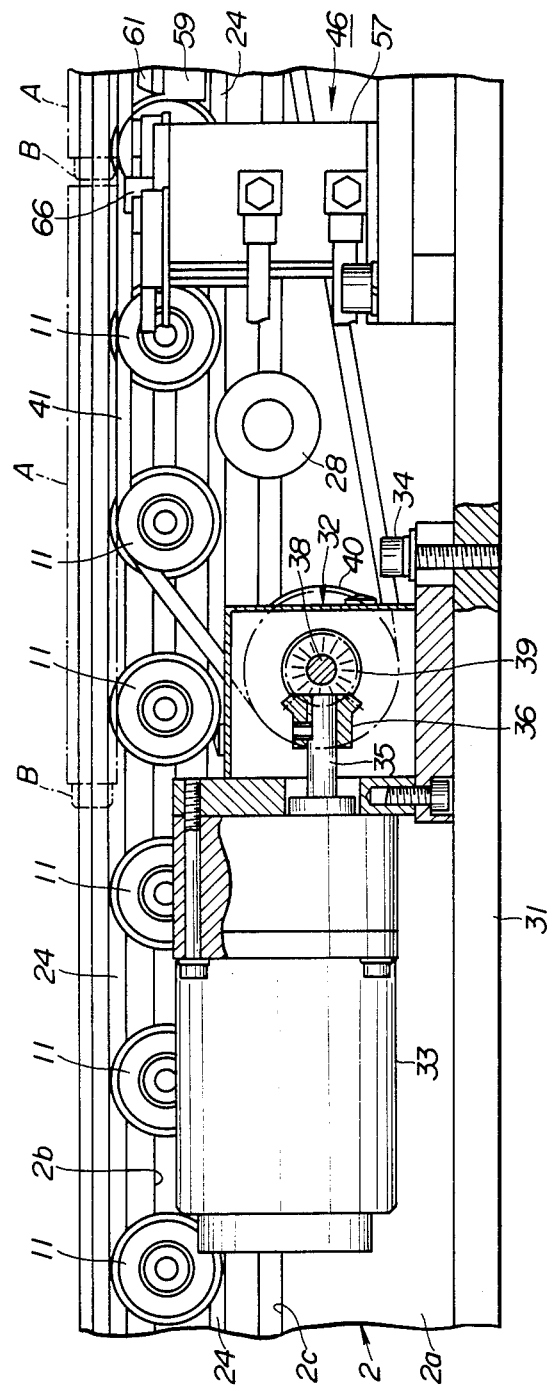
FIG. 6 is a further enlarged side elevation of the section of FIG. 5.
Figure 7:
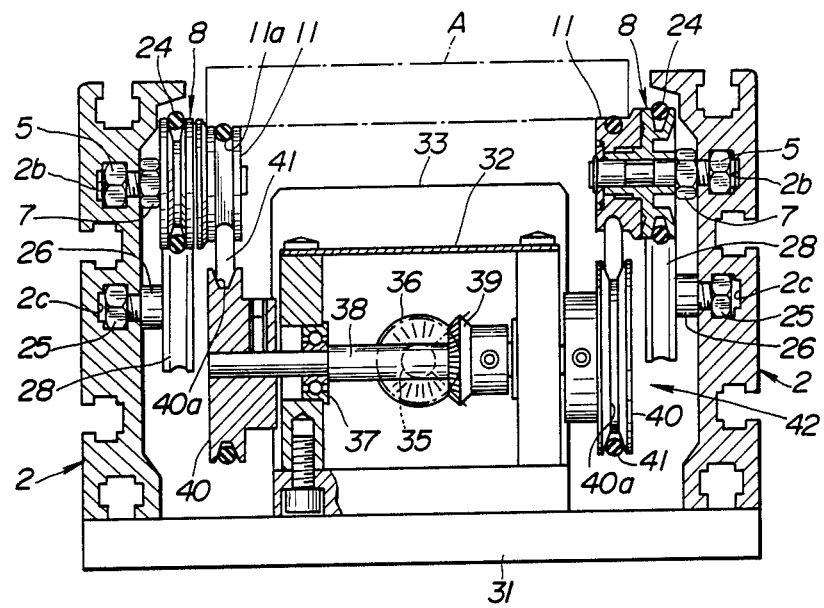
FIG. 7 is a section taken along line VII—VII of FIG. 5.

A quick stop and quick feed mechanism is provided at each of the production stations. The quick stop and quick feed mechanism comprises a lifting mechanism 43 for quickly stopping the object and lifting up the object. The lifting mechanism generally comprises a brake device 44, a back-up device 45 and stopper device 46, as shown in FIGS. 5 and 6.

Figure 9:
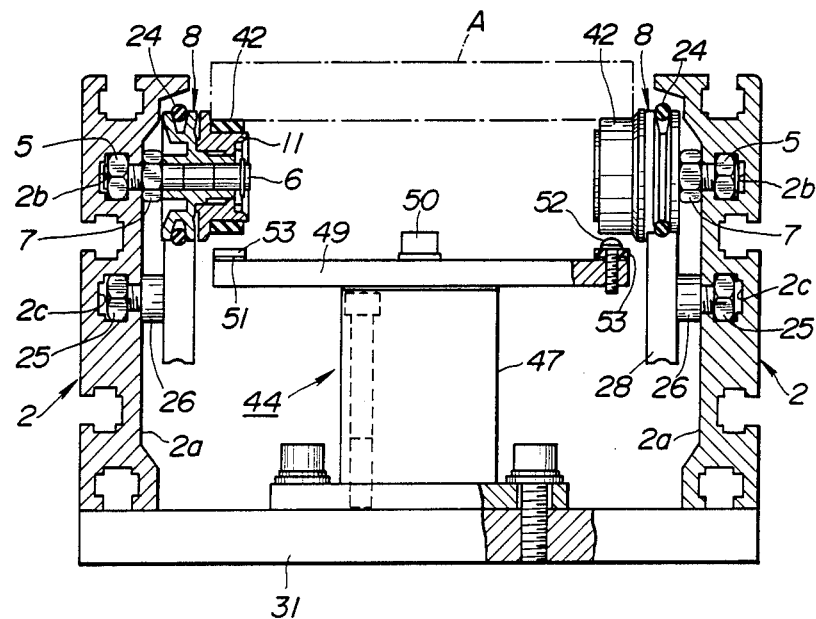
FIG. 9 is a section taken along line IX—IX of FIG. 5.
Figure 10:
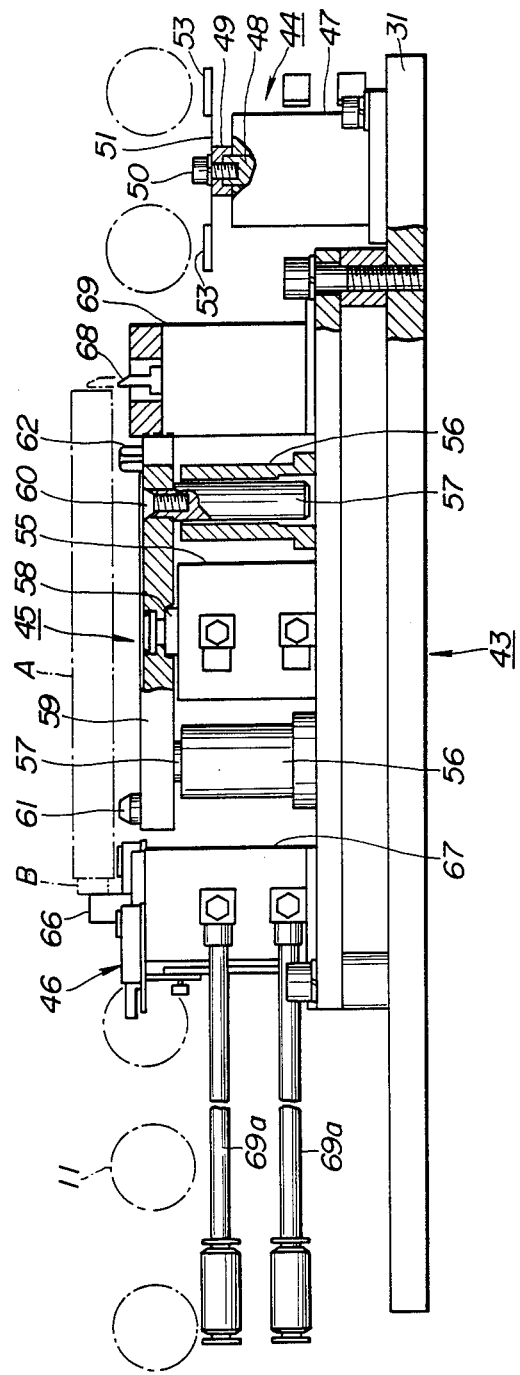
FIG. 10 is a side elevation of a lifting mechanism provided in the preferred embodiment of the conveyer system.

The brake device 44 has an air cylinder 47. An actuation rod 48 of the air cylinder 47 is connected to a support member 49 which extends laterally between laterally aligned rollers 11, as shown in FIGS. 9 and 10. The support member 49 is secured on the top of the actuation rod 48 by means of a fastener bolt 50. A plurality of brake assemblies, each of which comprises a leaf strip 51 and rubber pads 53, are secured onto lateral ends of the support member 49 by means of fastening screws 52. The leaf spring 51 extends longitudinally and is secured at about the longitudinal center thereof. The leaf with spring 51 is provided spring characteristics to normally bias its both longitudinal ends away from the support member 49. The ends of the leaf springs 51 oppose the longitudinally aligned pair of rollers 11. The rubber pads 53 are bonded on the surface of the leaf spring 51, at the position opposing the rollers 11. On the other hand, a rubber ring 42 is fitted onto the outer periphery of the rollers 11 which oppose the rubber pads 53, as is particularly shown in FIG. 9.

Figure 8:
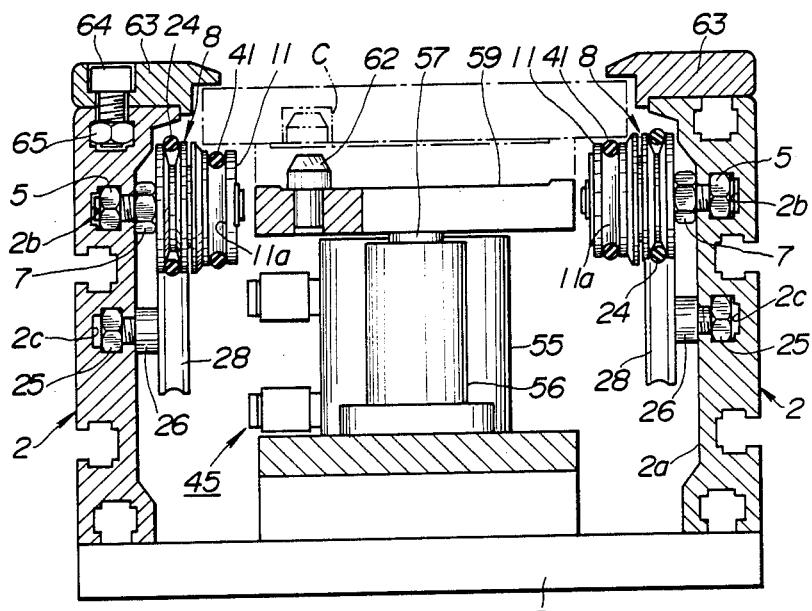
FIG. 8 is a section taken along line VIII—VIII of FIG. 5.

As shown in FIG. 8, the back-up device 45 includes an air cylinder 55. The air cylinder 55 has a cylinder rod 58 connected to a plate-shaped platform 59 by means of a screw 60. At the longitudinal ends, the platform 59 is connected to the tops of guide pins 57 which are vertically movable via guide cylinders 56, as shown in FIG. 10. Positioning pins 61 and 62 are projected from the upper surface of the platform 59. The orientation of the positioning pins 61 and 62 and the configurations thereof may be variable depending upon the objects. Namely, the object may be formed with positioning holes. The positioning pins 61 and 62 engage with those positioning holes C for precisely positioning the object A on the platform 59.

At the longitudinally corresponding position to the platform 59, upper guides 63 are secured onto the stop of the frame 2 by means of bolts 64 and nuts 65. These upper guides 63 generally are elongated in longitudinal direction of the flow path and extend lateral-inwardly so as to restrict upward movement of the object A on the platform 59.

As shown in FIG. 10, the stopper device 46 also includes a stopper 66 vertically movable by means of an air cylinder 67 and an escaper 68 which is vertically movable by means of an air cylinder 69. The air cylinders 67 and 69 are synchronously operable for synchronously operating the stopper 66 and escaper 68. The stopper 66 is designed to contact with a shock absorbing member B provided on the front edge of the object A when it is lifted at the lifted-up position. Since the shock exerted on the object A by collision with the stopper 66 can be successfully absorbed by the shock absorber member B, rebounding of the object A can be satisfactorily prevented. As set forth, since the stopper 66 and escaper 68 are synchronously operated between an up position and a down position, the escaper 68 prevents the subsequently fed objects from entering onto the platform.

The air cylinders 47, 55, 67 and 69 are connected to a pressurized air source via air supply lines 69a and 69b.

In operation, the drive motor 18 is driven for driving the drive pulleys 23 through the reduction gear unit 17. In the shown example, the drive motor 18 is driven to drive the drive pulleys 23 in a counterclockwise direction as indicated by an arrow in FIG. 3. By rotation of the drive pulleys 23, the drive belts 24 are driven to rotate respective driven pulleys 8 in a counterclockwise direction. Since the rollers 11 frictionally cooperate with the driven pulleys 8, the rollers are thus driven in a counterclockwise direction. In this condition, the object A put on the conveyer line is fed in the direction indicated by the arrow in FIG. 2.

Here, the revolution speed of the variable speed motor 33 is set so that the rollers 11 on which the drive belts 41 are wound therearound, may rotate in synchronism with rotation of the associated driven pulleys 8. When the object A, transferred on the conveyer line by the rotation of the rollers 11, reaches the orientation corresponding to the brake device 43, the presence of the object A above the brake device 43 may be detected by an appropriate sensor means. As a sensor means, any known device, such as a limit switch, proximity switch, optical sensor, electromagnetic sensor or so forth can be employed. Upon detection of the presence of the object above the brake device, the air cylinder 47 is actuated to lift the support member 49 upwardly so that the rubber pads 53 may be resiliently depressed onto the periphery of the corresponding rollers 11. Thus, the rubber pads 53 respectively contact with the rubber rings 42 on the roller periphery to decelerate the rotation speed of the associated rollers. In this way, the feed speed of the object A is reduced.

At this time, the revolution speed of the variable speed motor 33 is lowered in synchronism with the decrease of the feed speed. The revolution speed of the variable speed motor 33 may be thus controlled by a controller in a per se known manner.

The object A thus decelerated is further fed at a lowered feed speed. In synchronism with this, the air cylinder 67 of the stopper device 46 is actuated to lift up the stopper 66. At the same time, the air cylinder 69 is also actuated to lift the escaper 68. So as to allow synchronous upward movement of the stopper 66 and the escaper 68 without causing interference of movement of the object A before it collides to the stopper, the actuation timing 67 and 69 should be adjusted to lift the stopper 66 and the escaper 68 after the object A passes over the escaper 68 but before the object reaches the stopper 66. During this period, the object A is fed at the reduced speed to collide with the stopper 66 of the stopper device 46 at the shock absorber member C. Collision of the object A onto the stopper 66 is detected by a detector (not shown). When the detector detects collision of the object A onto the stopper 66, the variable speed motor 33 is stopped. By this, shock of the collision can be reduced so that the object can be gently stopped.

In synchronism with stopping of the variable speed motor 33, the air cylinder 55 of the back-up device 45 is actuated to lift the platform 59 upwardly. During this movement, the positioning pins 61 and 62 engage with the corresponding positioning openings C of the object A. The platform 59 is further lifted up until the upper surface of the object mates with the upper guides 63. Preferably, the stroke of the upward movement of the platform 59 may be determined in relation to the thickness of the object A and the vertical orientation of the upper guide 63.

While the object A is lifted to the position where the upper surface of the object mates with guide 63, the required assembling or production operation is performed. In view of this, the air cylinder 55 is held at the lift-up position for a given period of time which should be slightly longer than a maximum possible tact time.

After the given period of time is elapsed or, in the alternative, in response to manual feed command input, the air cylinder 55 is actuated to lower the platform 59 with the object A. By the downward movement of the platform, the lower surface of the object A returns to contact with the roller 11 which is stopped by stopping the variable speed motor 33. The platform 59 moves further downwardly to release engagement between the positioning pins 61 and 62 and the positioning openings C of the object. By this, the object A become free to be fed.

In synchronism with downward movement of the platform 59 by the action of the air cylinder 55, the air cylinders 67 and 69 are activated to lower the stopper 66 and the escaper 68 so that the object A can be fed to the next production station.

After the stopper 66 and the escaper 68 are moved to their initial and down position, the variable speed motor 33 is energized to drive the associated rollers 11 via the drive belts 41. At this time, the variable speed motor 33 is driven at a relatively high speed for quickly feeding the object A from the production station.

Figure 11:
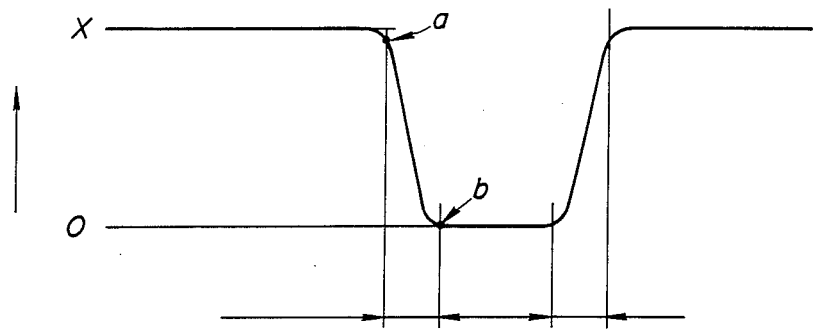
FIG. 11 is a chart showing variation of the feed speed at a production station.

The object feed speed variation to accomplish the aforementioned quick stop and quick feed in the production station is shown in FIG. 11. As will be seen from FIG. 11, a point a represents the object position reaching the brake device 44. Therefore, from the point a, the object is decelerated by deceleration of the variable speed motor driving speed to a point b which point represents the object's position when colliding with the stopper 66. As set forth, the variable speed motor 33 is stopped in response to collision of the shock absorber member B of the object and the stopper 66. Therefore, at the point b, the feed speed becomes zero.

After the production or assembling operation, the variable speed motor 33 starts driving to accelerate the feed speed of the object A. The acceleration characteristics of the feed are generally determined depending on the acceleration characteristics of the variable speed motor. Therefore, by selecting a proper variable speed motor, desired quick feed characteristics can be obtained by rapidly accelerating the roller speed.

Figure 12:
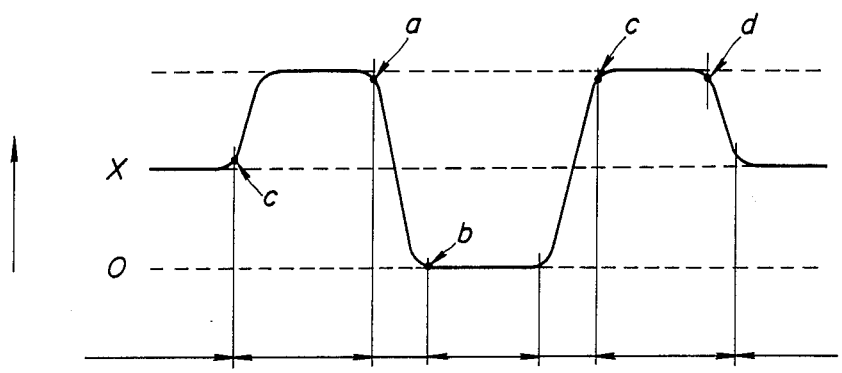
FIG. 12 is a chart showing another pattern of variation of the feed speed of the object at the production station.

FIG. 12 shows an alternative object feed pattern which can also be performed by the aforementioned preferred embodiment of the conveyer system according to the invention. In this feed pattern, the variable speed motor 33 is temporarily driven at a higher speed (hereafter referred to as "HIGH speed") when the object reaches a predetermined point which point is set upstream of the brake device 44. By driving the variable speed motor 33 at a HIGH speed, the object A is accelerated to be forcingly fed into the production station. Similarly to the foregoing pattern, the variable speed motor starts deceleration when the object A reaches the point a and stops at the point B where the object contact with the stopper 66.

After production operation, the variable speed motor 33 is accelerated to the HIGH speed. After reaching the HIGH speed at a point d, the driving speed of the variable speed motor 33 is maintained at the HIGH speed for a given period of time, until the object A reaches a point e. Thereafter, the driving speed is decelerated to a normal driving speed which is lower than the HIGH speed.

As will be appreciated, though the shown embodiment provides the special mechanism for performing a quick stop and a quick feed function at the production station, it may be possible to form the conveyer line without providing such a quick stop and quick feed mechanism. Even when such a mechanism is not provided, since the roller and associated pulley are engaged for rotation together only by a limited amount of friction, the roller can be easily stopped by applying a small force which overcomes the friction between the pulley and roller. Therefore, while production or an assembling operation is performed, the roller can be held at a stopped position. This makes the object stable in the production station.

Therefore, the invention fulfills all of the objects and advantages sought therefore.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A conveyer system comprising:
   a pair of frames extending longitudinally and in an essentially parallel relationship to each other;
   a plurality of roller assemblies mounted on said frames, each of said roller assemblies including a roller rotatably supported on said frame and aligned to rollers of other roller assemblies to define a conveying path through which an object to be conveyed is transferred;
   a driving mechanism for rotatingly driving said rollers in said roller assemblies for exerting a feed force to said object;
   friction means interposed between said driving mechanism and said rollers of said roller assemblies for connecting and disconnecting said driving mechanism to said rollers, said friction means normally operative to connect said driving mechanism to said rollers for transmitting the driving force of the drive mechanism to said rollers for rotation and being responsive to a resistance against rotation exerted on said roller and greater than a given magnitude to disconnect said driving mechanism from the roller on which said resistance greater than said given magnitude is exerted; and
   means, oriented at a predetermined orientation in said conveyer path, for quickly stopping and quickly feeding out said object, wherein said quickly stopping and quickly feeding out means includes an auxiliary driving mechanism being associated with rollers oriented at positions corresponding to the orientation of said quickly stopping and quickly feeding out means and having a variable driving speed for varying rotation speed of the associated rollers.

2. A conveyer system as set forth in claim 1, wherein said friction means is active on each of said rollers so as to establish and block power transmission between each roller and said driving mechanism independently of other rollers so that when one of the rollers is disconnected from said driving mechanism, other rollers are driven by said driving mechanism to rotate by maintaining power transmission from said driving mechanism.

3. A conveyer system as set forth in claim 1, wherein said driving mechanism comprises a drive motor, a power train for transmitting the driving torque of said drive motor, and a plurality of pulleys drivingly associated with said power train to be driven by said driving torque of said drive motor, each of said pulleys cooperating with one of said rollers for rotation therewith while said friction means is active to connect said driving mechanism and the corresponding roller.

4. A conveyer system as set forth in claim 3, wherein said friction means comprises a first periphery on said roller cooperating with a second periphery of said pulley, said first and second peripheries mating with each other and frictionally engaging for transmitting driving torque from said drive motor via said power train in a connecting condition, said first and second peripheries causing mutual slip for stopping rotation of said roller in response to said resistance greater than said given magnitude while said pulley maintains rotation, in a disconnecting condition.

5. A conveyer system as set forth in claim 4, wherein said roller and pulley cooperating with each other are coaxially arranged and supported by a common shaft extending from said frame.

6. A conveyer system as set forth in claim 4, which further comprises means for limiting contact area between said first and second peripheries, which contact area limiting means determines contact area between said first and second peripheries and whereby determines said magnitude of friction between said first and second peripheries.

7. A conveyer system as set forth in claim 1, wherein said auxiliary driving mechanism decelerates rotation speed of said associated rollers when said object reaches a first predetermined point in said conveyer line and stops revolution for a given period of time when said object reaches a second predetermined point for stopping said object at said second point.

8. A conveyer system as set forth in claim 7, wherein said auxiliary driving mechanism resumes revolution after said given period of time for driving said associated rollers at a given speed.

9. A conveyer system as set forth in claim 1, wherein said auxiliary driving mechanism accelerates rotation speed of said associated rollers when said object reaches a first predetermined point in said conveyer line, decelerates rotation speed of said associated rollers when said object reaches a second predetermined point downstream of said first predetermined point and stops revolution for a given period of time when said object reaches a third predetermined point for stopping said object at said third point.

10. A conveyer system as set forth in claim 9, wherein said auxiliary driving mechanism resumes revolution after said given period of time for driving said associated rollers at a given speed.

11. A conveyer system as set forth in claim 1, wherein said quickly stopping and quickly feeding out means further comprises a lifting means operable between an initial down position and a lifted up position where it lifts up said object away from said conveyer line.

12. A conveyer system as set forth in claim 11, wherein said auxiliary driving mechanism decelerates rotation speed of said associated rollers when said object reaches a first predetermined point in said conveyer line and stops revolution for a given period of time when said object reaches a second predetermined point for stopping said object at said second point.

13. A conveyer system as set forth in claim 12, wherein said lifting means is oriented at said second point.

14. A conveyer system as set forth in claim 13, wherein said said quickly stopping and quickly feeding out means further comprises a braking means provided at an orientation corresponding to said first point and active on one or more rollers located at said first point for slowing down rotation speed of the corresponding rollers.

15. A conveyer system comprising:
a pair of frames extending longitudinally and in essentially parallel relationship to each other;
a plurality of roller assemblies mounted on said frames, each of said roller assemblies including a roller rotatably supported on said frame and aligned to rollers of other roller assemblies to define a conveying path through which an object to be conveyed is transferred;
a driving mechanism for rotatingly driving said rollers in said roller assemblies for exerting feed force to said object;
friction means interposed between said driving mechanism and said rollers of said roller assembly for allowing slip to occur between said driving mechanism and said rollers when the load on said rollers causes the resistance of said roller to rotation to exceed a given magnitude; and
means, oriented at a predetermined orientation in said conveyer path, for quickly stopping and quickly feeding out said object, wherein said quickly stopping and quickly feeding out means includes an auxiliary driving mechanism being associated with rollers oriented at positions corresponding to the orientation of said quickly stopping and quickly feeding out means and variable with driving speed for varying rotation speed of the associated rollers.

16. A conveyer system as set forth in claim 15, wherein said friction means is provided for each of said rollers so as to limit power transmission between said driving mechanism and each of said rollers and independently of the other rollers so that when one of the rollers is slipping relative to said driving mechanism, other rollers are driven to rotate by said driving mechanism.

17. A conveyer system as set forth in claim 15, wherein said driving mechanism comprises a drive motor, a power train for transmitting the driving torque of said drive motor, and a plurality of pulleys drivingly associated with said power train to be driven by said driving torque of said drive motor, each of said pulleys cooperating with one of said rollers for rotation therewith when said friction means is active to connect said driving mechanism to the corresponding roller.

18. A conveyer system as set forth in claim 17, wherein said friction means comprises a first periphery of said roller cooperating with second periphery of said pulley, said first and second peripheries mating with each other and frictionally engaging for transmitting driving torque from said drive motor via said power train, said first and second peripheries allowing mutual slip for allowing rotation of said roller to stop in response to said resistance greater than said given magnitude while said pulley continues to rotate.

19. A conveyer system as set forth in claim 18, wherein said roller and pulley cooperating with each other are coaxially arranged and supported by a common shaft extending from said frame.

20. A conveyer system as set forth in claim 18, which further comprises means for limiting contact area between said first and second peripheries, which contact area limiting means determines contact area between said first and second peripheries and whereby determines magnitude of friction between said first and second peripheries.

21. A conveyer system as set forth in claim 15, wherein said auxiliary driving mechanism decreases rotation speed of said associated rollers when said object reaches a first predetermined point in said conveyer line and stops revolution for a given period of time when said object reaches a second predetermined point for stopping said object at said second point.

22. A conveyer system as set forth in claim 21, wherein said auxiliary driving mechanism resumes revolution after said given period of time for driving said associated rollers at a given speed.

23. A conveyer system as set forth in claim 15, wherein said auxiliary driving mechanism increases rotation speed of said associated rollers when said object reaches a first predetermined point in said conveyer line, decelerates rotation speed of said associated rollers when said object reaches a second predetermined point downstream of said first predetermined point and stops revolution for a given period of time when said object reaches a third predetermined point for stopping said object at said third point.

24. A conveyer system as set forth in claim 23, wherein said auxiliary driving mechanism resumes revolution after said given period of time for driving said associated rollers at a given speed.

25. A conveyer system as set forth in claim 15, wherein said quickly stopping and quickly feeding out means further comprises a lifting means operable between an initial down position and a lifted up position where it lifts up said object away from said conveyer line.

26. A conveyer system as set forth in claim 25, wherein said auxiliary driving mechanism decreases rotation speed of said associated rollers when said object reaches a first predetermined point in said conveyer line and stops revolution for a given period of time when said object reaches a second predetermined point for stopping said object at said second point.

27. A conveyer system as set forth in claim 25, wherein said lifting means is oriented at said second point.

28. A conveyer system as set forth in claim 27, wherein said quickly stopping and quickly feeding out means further comprises a braking means provided at an orientation corresponding to said first point and active on one or more rollers located at said first point for slowing down rotation speed of the corresponding rollers.

29. A roller conveyer system comprising:
a plurality of roller assemblies arranged in alignment to define a conveying path, through which an object to be conveyed is transferred, each of said roller assemblies including a first rotary component having a first periphery contacting with said object for exerting feeding energy thereto and a second periphery, and a second rotary component having a third periphery frictionally engaging with said second periphery of said first rotary component for cooperating said first and second rotary components, the magnitude of friction established between said second and third peripheries being so determined so to normally maintain frictional engagement and to break frictional engagement to allow slip between said second and third peripheries for stopping rotation of said first rotary component while said second rotary component maintains rotation, in response to a resistance against rotation of said first rotary component exerted on said first periphery greater than a given magnitude;

a driving mechanism for rotatingly driving said second components of said roller assemblies and means, oriented at a predetermined orientation in said conveyer path, for quickly stopping and quickly feeding out said object, wherein said quickly stopping and quickly feeding out means includes an auxiliary driving mechanism being associated with said first rotary components of roller assemblies oriented at positions corresponding to the orientation of said quickly stopping and quickly feeding out means and variable with driving speed for varying rotation speed of the associated first rotary components.

30. A conveyer system as set forth in claim 29, wherein said driving mechanism comprises a drive motor and a power train for transmitting the driving torque of said drive motor, which power train includes a drive belt wound around said second rotary components of said roller assemblies for transmitting driving torque.

31. A conveyer system as set forth in claim 30, said first rotary component and said second rotary component cooperating with each other are coaxially arranged and supported by a common shaft extending from a pair of support frames respectively extending along said conveyer path.

32. A conveyer system as set forth in claim 29, which further comprises means for limiting contact area between said second and third peripheries, which contact area limiting means determines contact area between said second and third peripheries and whereby determines magnitude of friction between said second and third peripheries.

33. A conveyer system as set forth in claim 29, wherein said auxiliary driving mechanism decelerates rotation speed of said associated first rotary components when said object reaches a first predetermined point in said conveyer line and stops revolution for a given period of time when said object reaches a second predetermined point for stopping said object at said second point.

34. A conveyer system as set forth in claim 33, wherein said auxiliary driving mechanism resumes revolution after said given period of time for driving said associated rollers at a given speed.

35. A conveyer system as set forth in claim 29, wherein said auxiliary driving mechanism accelerates rotation speed of said associated first rotary assemblies when said object reaches a first predetermined point in said conveyer line, decelerates rotation speed of said associated first rotary components when said object reaches a second predetermined point downstream of said first predetermined point and stops revolution for a given period of time when said object reaches a third predetermined point for stopping said object at said third point.

36. A conveyer system as set forth in claim 35, wherein said auxiliary driving mechanism resume revolution after said given period of time for driving said associated first rotary components at a given speed.

37. A conveyer system as set forth in claim 29, wherein said quickly stopping and quickly feeding out means further comprises a lifting means operable between an initial down position and a lifted up position where it lifts up said object away from said conveyer path.

38. A conveyer system as set forth in claim 37, wherein said auxiliary driving mechanism decelerates rotation speed of said associated first rotary components when said object reaches a first predetermined point in said conveyer line and stops revolution for a given period of time when said object reaches a second predetermined point for stopping said object at said second point.

39. A conveyer system as set forth in claim 38, wherein said lifting means is oriented at said second point.

40. A conveyer system as set forth in claim 38, wherein said said quickly stopping and quickly feeding out means further comprises a braking means provided at an orientation corresponding to said first point and active on one or more first rotary components located at said first point for slowing down rotation speed of the corresponding rollers.

* * * * *